Aug. 21, 1951     L. L. GURNEY     2,565,227
PLATE GLASS ASSEMBLY
Filed Jan. 29, 1947     2 Sheets-Sheet 1

Inventor
L. L. Gurney
By Arthur H. Sturges
Attorney

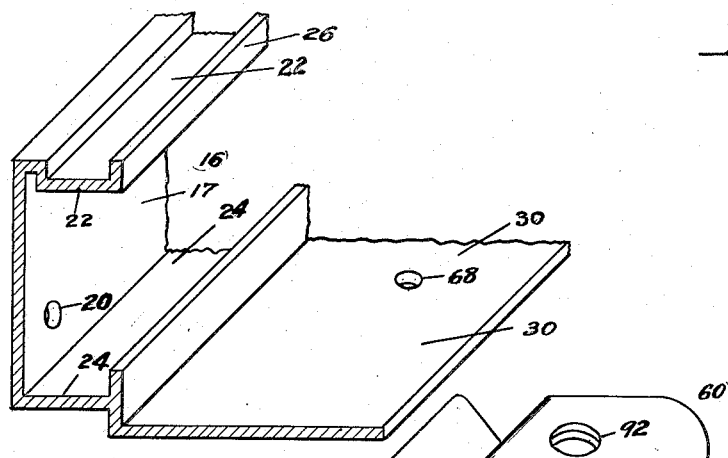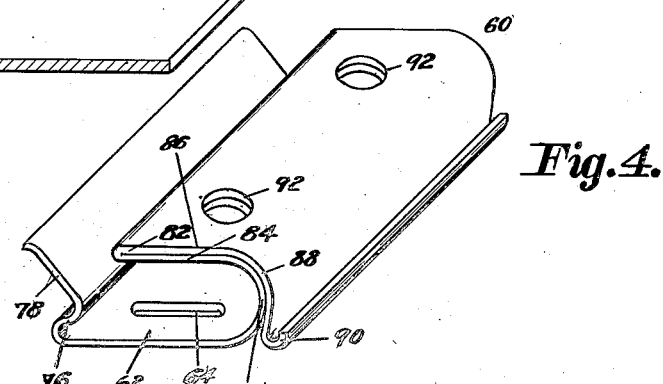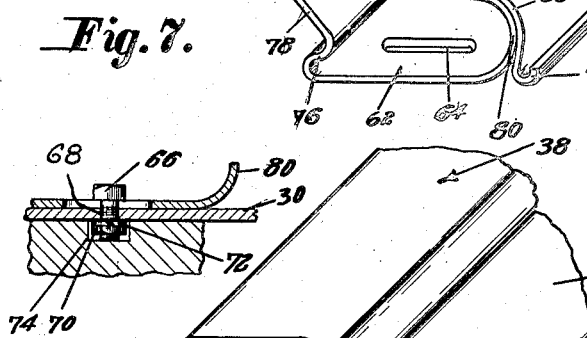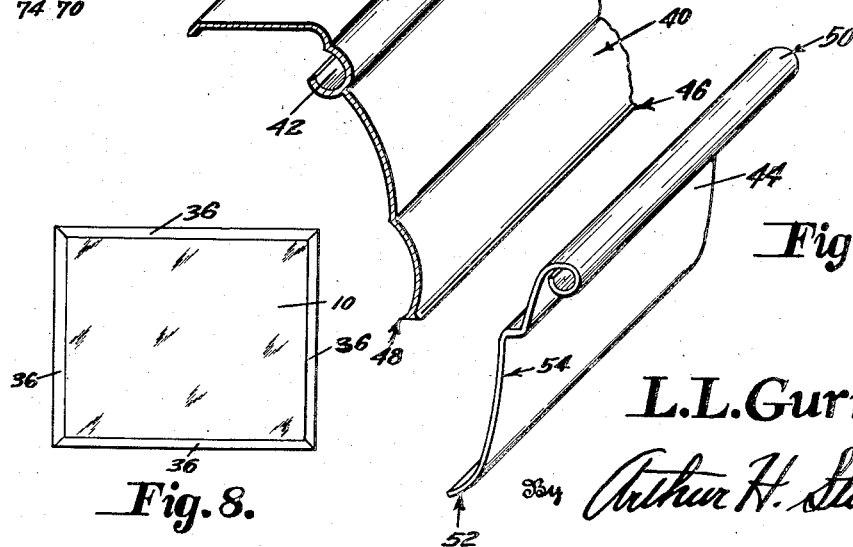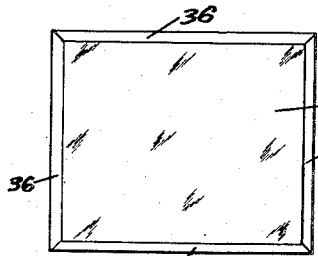

Patented Aug. 21, 1951

2,565,227

UNITED STATES PATENT OFFICE 2,565,227

PLATE GLASS ASSEMBLY

Laird L. Gurney, Lincoln, Nebr.

Application January 29, 1947, Serial No. 725,120

1 Claim. (Cl. 20—56.4)

The present invention relates to window openings and more particularly to a device for holding plate glass therein.

It is an object of the invention to provide a construction whereby a comparatively large sheet of plate glass may be positioned within a window opening for closing the latter and in a manner whereby a sheet of plate glass is less susceptible to breakage resultant from wind pressures being applied to the glass than heretofore.

Another object of the invention is to provide a mechanism for the above described purposes which is so constructed that a firm and even pressure is applied to the plate glass in a manner whereby the latter is free to bend somewhat under the influence of wind pressures while at the same time the glass is firmly gripped by the new device.

A further object of the invention is to provide a device which is substantially air-tight at all times during use; in other words, the device is so constructed that air does not pass through an opening adjacent the new mounting for the glass.

A still further object of the invention is to provide a construction for the above stated purposes which is comparatively easily installed and which consists of few and small parts.

Another object of the invention is to provide a construction which may be readily installed with a minimum of labor time whereby installation is economical.

A still further object is to provide a construction by an employment of which salvage glass may be readily installed, the said device being so constructed that it automatically adjusts itself to salvage glass or other glass of varying thicknesses with respect to an original installation of glass, whereby it is not necessary that a sheet of replacement glass shall be of exactly the same thickness as the original piece of glass as heretofore.

Still further objects of the invention reside in the provision of a plate glass holding assembly as described in which an even, firm, cushion-like pressure is applied to all sides of the plate glass; in which glass of various thicknesses may be employed; which may be installed with great speed and accuracy; in which no screw heads or the like are visible from the outside; in which a broken piece of plate glass may be replaced from the outside without disturbing a window display; and in which there are no corrodable parts exposed to the weather.

Other and further objects and advantages of the invention will become apparent from the following description of a preferred embodiment thereof and from the accompanying drawings in which:

Figure 3 is a detailed perspective view of a portion of a substantially C-shaped member and an integral flat plate employed in the invention;

Figure 4 is a perspective view of one of the spring holding brackets employed;

Figure 5 is a perspective view of a broken away portion of a cover member employed;

Figure 6 is a perspective view of one of the resilient springs used to hold the cover member of Figure 5 in place;

Figure 7 is a detailed view in section of a broken away portion of a window sill and showing the preferred method of adjustably securing the spring holding bracket of Figure 4 to the flat plate shown in Figure 3; and Figure 8 is a frontal elevation of a window pane having the device of this invention secured entirely around the perimeter thereof.

Figure 1:
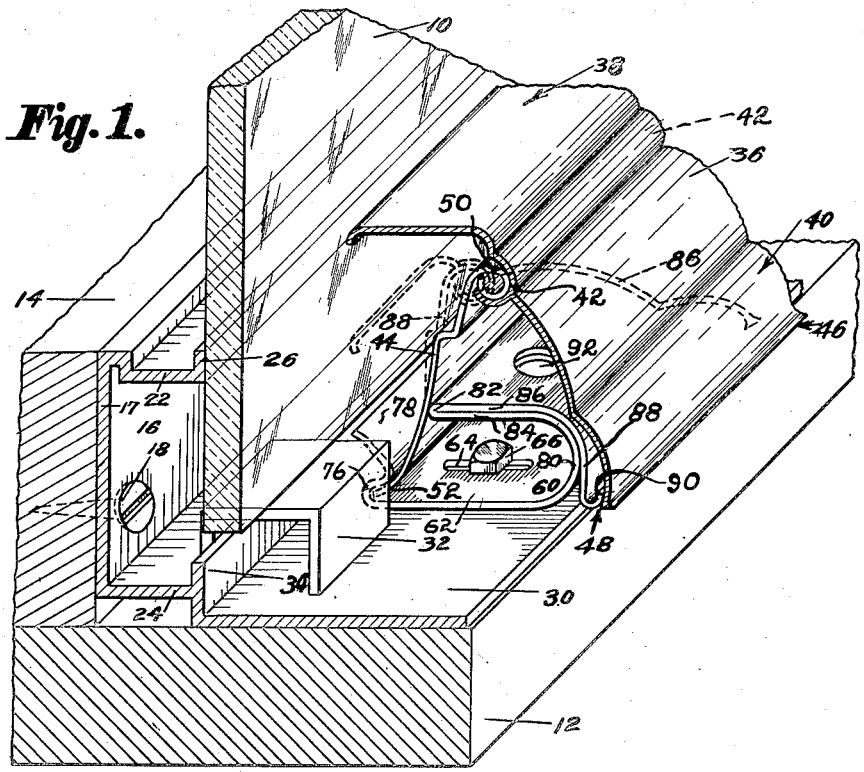
Figure 1 is a perspective sectional view of the window pane holding device of the invention shown as attached to a wall portion of a window opening, a portion of the window pane being shown as held in position by the device.
Figure 2:
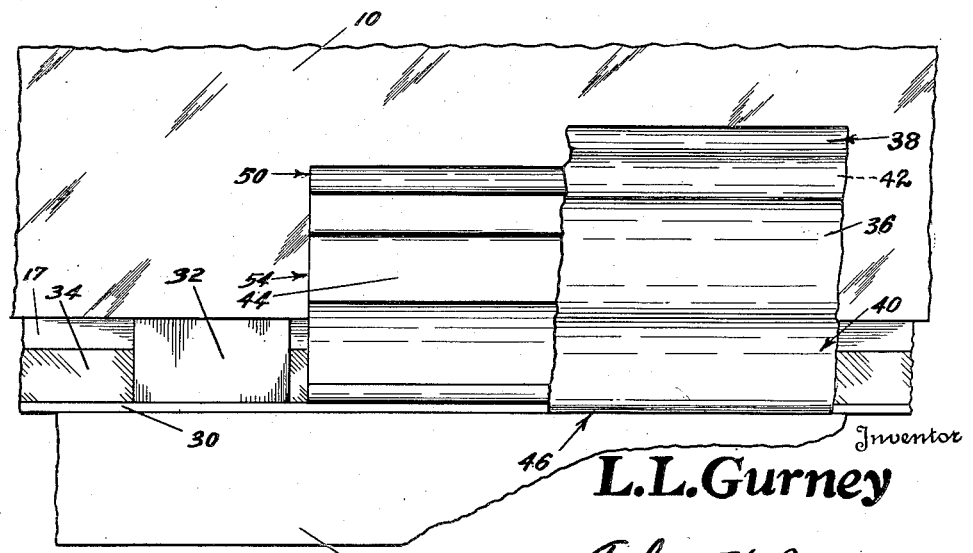
Figure 2 is a frontal elevation of the device as shown in Figure 1.

The window glass holding device of this invention is for the purpose of securing a window pane shown at 10 in Figure 1 in position covering a window opening, the walls of the latter being formed of a window sill 12 extending at a right angle to the plane of the window opening, and a backing board 14, the latter being in parallelism with the plane of the window opening and being secured to the window sill 12 in a position preferably on the inward side of the window sill 12. Such inward side is indicated by the arrow 15.

A member substantially C-shaped in cross-section is provided as generally indicated at 16 and shown in detail in Figure 3. The main body portion of the C-shaped member 17 is preferably parallel with and abutted against the backing board 14. Any suitable means, such as the screws 18 inserted through apertures 20 in the main body portion or inner wall 17 and extending into the backing board 14, may be used for securing the C-shaped member 16 to the side walls of the window opening. The C-shaped member 16 is preferably provided with upper and lower arms 22 and 24, respectively, the latter extending outwardly at right angles, to the main body portion 17. The upper arm 22 is provided with a window pane engaging portion or flange 26, the latter extending in parallelism with the window pane 10 for the purpose of engaging the window pane 10 over a wider area than would be possible with the end of the arm 22 alone.

The lower arm 24 of the C-shaped member 16 is attached to a flat plate 30, the latter extending at a right angle to the main body portion 17 of the C-shaped member 16 and in parallelism with the window sill 12 providing a substantially L shape mounting rail, with a vertical leg in which the C-shape member is formed and a horizontal leg. The flat plate 30 abuts against the window sill 12 on all sides of the window opening. The edge of the glass window pane 10 is spaced from the lower arm 24 of the C-shaped member 16 and from the flat plate 30 by any suitable supports 32. Preferably, the supports 32 are of an inverted U-shape, the sides of the U resting upon the flat plate 30 and the lower arm 24, and the main body portion of the U supporting the edge of the plate glass 10. The supports 32 may be placed at any suitable intervals along the edges of the plate glass 10. Preferably, however, the U-shaped supports 32 are of a length less than the total length of the edges of the plate glass 10 so that at times when the wind pressures blow on the plate glass 10, the friction of the engagement of the plate glass 10 and the supports 32 will be small enough to permit a certain amount of bending motion of the glass.

It is desirable that each of the supports 32 be of about two inches in length and assuming that the sheet of glass 10 is 20 feet wide. The space supports 32 along a single edge of a quadrangular piece of glass 10 are usually about two feet from the corners of the glass. A ridge 34 is provided integral with and extending upwardly from the lower arm 24 of the C-shaped member 16 for the purpose of maintaining the spacing supports 32 in position in engagement with the edges of the piece of glass 10.

The corner formed by the pane of glass 10 and the flat plate 30 is hidden by means of a cover plate 36, the latter having, if desired, a series of rounded portions for giving the cover 36 a pleasant outward appearance. The cover 36 has an inwardly disposed portion or flange 38 which in normal position, as shown in Figure 1, is relatively horizontally disposed. The remainder 40 of the cover 36 preferably extends downwardly and at an angle from the upper portion 38 thereof providing an arcuate vertically disposed flange. The under side of the cover 36 is provided with a rounded well 42, the well being slightly more than semi-circular in cross-section providing a cylindrical socket, as best shown in Figure 5, the upper inwardly disposed side of the well 42 being open for the insertion of the upper end of a later described spring plate 44. The inward end of the cover 36 is normally disposed in engagement with the plate glass 10 in a position directly opposite the window pane engaging portion 26 of the C-shaped member 16. The lower edge of the cover 36 is preferably provided with an outwardly flanged drip rim 46, the latter being for the purpose of shielding the window sill 12 from rain water. The inward side of the lower edge of the cover 36 is preferably provided with an inwardly disposed flange 48 for holding the cover 36 in outwardly spaced relationship with respect to the window sill 12.

The springs 44 are each provided with a hook end or rolled upper end 50, the latter defining a circle of a size for insertion into the circular well 32 of the cover 36. The lower end 52 of the spring 44 is preferably curved inwardly toward the window pane 10 with respect to the main body portion 54 of each spring 44.

Spring holding brackets generally indicated at 60 are provided, each having a flat main body portion on horizontal leg 62 for engagement with the top of the flat plate 30, the main body portion 62 having slots 64 therein, the latter extending in a direction at a right angle to the pane of glass 10. The slots 64 are for receiving suitable bolts 66 which latter extend through apertures 68 in the flat plate 30. The lower end of the bolts 66 is provided with a nut 70 and a lock washer 72, the lock washers being for the purpose of securing the bolts 66 in place during vibratory motions of the building in which the pane of glass 10 is attached.

A notch 74 of suitable size is cut into the sill 12 for the reception of the nuts 70. The inward end of the bracket 60 is provided with a U-shaped outwardly curved portion or lip 76 and, if desired, an inwardly disposed portion 78 may be provided integral with the outwardly disposed U-shaped portion 76 for guiding the lower end of the spring 44 into position in the U-shaped portion 76 of the bracket 60. The U-shaped portion 76 is for the purpose of receiving the lower end 52 of the spring 44. The outer end of the bracket 60 is provided with a second U-shaped portion 80, extending inwardly from the main body portion 62 and a third U-shaped portion 82 is provided on the end of the U-shaped portion 80, the third U-shaped portion 82 extending outwardly again. The inward end of the U-shaped portion 82 extends to within a position vertically spaced from and relatively close to the first U-shaped portion 76 of each bracket 60. The inward end of the third U-shaped portion 82 is for the purpose of abutting against the spring 44 and it will be seen that that section 84 of the bracket 60 which lies between the second U-shaped portion 80 and the third U-shaped portion 82 thereof is spaced from and extends in parallelism with the main body portion 62 of the bracket 60. That portion 86 of the bracket 60 which extends outwardly from the third U-shaped portion 82 is positioned directly above and in parallelism with the portion 84 and the outward end of the portion 86 terminates in a downwardly curved portion 88, the latter extending downward to within the horizontal plane of the main body portion 62 of the bracket 60. The lower end of the portion 88 may be provided, if desired, with an upwardly turned reinforcing flange 90, the latter also being for the purpose of abutting the inwardly disposed flange 48 of the cover 36. Suitable apertures 92 are provided extending through the portions 86 and 84 of the bracket 60 so that a wrench-tool may be inserted therethrough for tightening the bolts 66.

In operation, it will be seen that the window holding assembly of this invention may be installed by first securing the C-shaped member 16 and the integral flat plate 30 to the window sill 12 and the backing board 14 by means of the screws 18. Thereupon the spacing supports 32 are placed in position extending over the ridge 34. The window pane 10 of plate glass is then set in place on the supports 32 and abutting against the window engaging flange 26 of the C-shaped portion 16.

The spring holding brackets 60, the latter being approximately 3 inches long, are then placed in positions upon the flat plate 30. For a quadrangular window pane 10, a plurality of the brackets 60 would be used on each side depending upon the size of the pane 10. The brackets 60 are then bolted by means of the bolts 66 in a desired position against the flat plate 30, the desired position in this case depending upon the thickness of the plate glass 10.

The curled upper ends 50 of the springs 44 are then placed in position in the wells 42 of the covers 36. Each of the latter may then be placed in the positions shown in dotted lines at 86 in Figure 1. The lower end 52 of each of the springs 44 will then be guided into position in the curved portions 76 of the bracket 60. The covers 36 may then be twisted from the position 86' to the full line position as shown in Figure 1. This twisting motion will force the springs 44 from the position 88 as shown in dotted lines in Figure 1 to the full line position there shown.

It will be seen that as thus assembled, the tension placed upon the springs 44 as they bear against the third U-shaped portions 82 of the brackets 60 will hold the inward edge of the cover 36 tightly against the window pane 10, the lower side or flanged edge 48 of the cover 36 being tightly held against the outer edges 90 of the brackets 60 and against the outer edge of the window sill 12. After the covers 36 have been thus installed about the circumference of the window pane 10, and since the covers 36 have mitered corners, the assembly will have an appearance as shown in Figure 8.

From the foregoing description, it is thought to be obvious that a plate glass assembly constructed in accordance with my invention is particularly well adapted for use by reason of the convenience and facility with which it may be assembled and operated, and it will also be obvious that my invention is susceptible of some change and modification without departing from the principles and spirit thereof and for this reason, I do not wish to be understood as limiting myself to the precise arrangement and formation of the several parts herein shown in carrying out my invention in practice, except as claimed.

I claim:

In a plate glass mounting frame section, the combination which comprises a substantially L-shape mounting rail having a horizontally disposed leg with bolt holes therein and a vertically disposed leg, said vertically disposed leg being C-shape in cross section having an inner wall with an upper arm having a longitudinally disposed recess therein and having a glass abutting flange on the outer edge and a lower arm spaced from the lower surface of the horizontal leg and connected to said horizontal leg through a vertically positioned flange which is located in a plane extended through a pane of glass positioned against the flange of the upper arm, spaced inverted U-shape supports positioned over the said vertically positioned flange for receiving a pane of glass, horizontally positioned spring holding brackets U-shape in cross section having a lower main body section positioned on the horizontally disposed leg of the mounting rail and an upper shorter section connected to the lower section through an arcuate end, said upper section folded upon itself, extended downwardly over the arcuate end and having a U-shape reinforcing flange on the lower edge, the inner edge of said horizontally disposed section of the bracket having an arcuate lip with an outwardly extended flange thereon, a cover plate having a substantially horizontally disposed flange on the upper edge with a vertically disposed arcuate flange on the lower edge connected to the horizontally disposed flange with an arcuate section and having an elongated substantially cylindrical socket with an open side on the inner surface, and a vertically disposed arcuate spring plate having a rolled upper end positioned with the rolled upper end pivotally mounted in the cylindrical socket of the cover plate and located between the cover plate and glass with the lower edge in the arcuate lip of the horizontally disposed section of the bracket and with the intermediate part thereof resiliently held against the end of the said short section of the bracket, whereby the said cover plate is resiliently urged against the said pane of glass and mounting rail.

LAIRD L. GURNEY.

REFERENCES CITED

The following references are of record in the file of this patent:

UNITED STATES PATENTS

| Number | Name | Date |
| --- | --- | --- |
| Re. 17,706 | Nelson | June 17, 1930 |
| 2,190,720 | Lowry | Feb. 20, 1940 |
| 2,268,269 | Toney et al. | Dec. 30, 1941 |
| 2,296,720 | Lowry | Sept. 22, 1942 |
| 2,321,237 | Peterson | June 8, 1943 |
| 2,411,691 | Miller | Nov. 26, 1946 |